United States Patent
Nguyen et al.

[19]

[11] Patent Number: 5,872,959
[45] Date of Patent: Feb. 16, 1999

[54] METHOD AND APPARATUS FOR PARALLEL HIGH SPEED DATA TRANSFER

[75] Inventors: Trung T. Nguyen, San Jose; Henry Yang, Fremont, both of Calif.; Randy E. Bach, Stillwater, Minn.; Kevin Daberkow, Fremont, Calif.

[73] Assignee: LSI Logic Corporation, Milpitas, Calif.

[21] Appl. No.: 711,502

[22] Filed: Sep. 10, 1996

[51] Int. Cl.⁶ .................................................... G06F 1/04
[52] U.S. Cl. ................................ 395/552; 395/309
[58] Field of Search .................... 395/551, 552, 395/558, 559, 845, 309

[56] References Cited

U.S. PATENT DOCUMENTS 5,513,377  4/1996  Capowski et al. .................. 395/881
5,572,722  11/1996  Vogley ................................. 395/555
5,692,165  11/1997  Jeddeloh et al. .................... 395/551

*Primary Examiner*—Dennis M. Butler
*Attorney, Agent, or Firm*—Conley, Rose & Tayon, PC; B. Noel Kivlin

[57] ABSTRACT

The present invention concerns a method for eliminating or reducing clock skew introduced by differing signal propagation delays across a data bus. At high bus clock frequencies the time delay differences caused by path length differences can be catastrophic and must be eliminated by expensive layout techniques. An input/output (I/O) architecture is proposed here which tailors a delay to each individual data line, and thereby aligns all the incoming data. Furthermore, a clock signal is provided to indicate the optimal data sampling time. In the described embodiment, this circuit enables the transmission of four 32 bit words in parallel in one clock cycle of a 250 MHz processor.

12 Claims, 9 Drawing Sheets

METHOD AND APPARATUS FOR PARALLEL HIGH SPEED DATA TRANSFER

BACKGROUND OF THE INVENTION

1. Field of the Invention

This invention relates to the field of high speed digital communications and in particular to mechanisms for high speed inter-processor communication.

2. Description of the Relevant Art

Improving technology fuels the drive to operate devices at higher frequencies. One of the problems encountered as a result of the use of higher frequencies for inter-processor communication is that of data skew. In connecting elements of a computer board such as processors, memory chips, and exterior interface ports, board designers must take into account the clock frequency and propagation delays of the data bus. At clock frequencies of 1 GHz a length difference of one centimeter between bus lines is sufficient to cause substantial misalignment in data which may result in bit errors when sampled according to a fixed clock signal. Hence the board designer must take great care to ensure that all data lines in the bus are of nearly the same length, which often requires the addition of otherwise unnecessary meanders to increase the length of shorter bus lines. When this is done, it does not necessarily eliminate all of the data skew, but it does create a "window" in which all the data signals are valid at the same time. This allows for the adjustment of the timing of the clock signal to line up with the window of data validity. As the number of bus lines increases, it becomes more difficult to create a window in which all data signals are valid, particularly since the length discrepancy grows with the width of the data bus. Bus widths of greater than 8 data lines often prove impractical due to the increase in area and layout complexity required by meanders. Consequently increasing bus widths or clock speeds are typically not methods which can be used to increase I/O throughput.

This being said, it is nevertheless the case that as processors increase in power and speed, the requirement for I/O throughput increases as well. This problem has been mainly addressed by using memory caching techniques to increase I/O efficiency. This is achieved by passing data in blocks rather than as individual bytes on the established pattern that memory accesses are not independent. Rather, they exhibit characteristics known as time-and-space locality which in effect means that when one memory location in a region is accessed, a high probability exists that subsequent memory accesses will be in the same region. By "gambling" on this and sending all the memory in the region along with the requested data byte, often the subsequent memory accesses can be eliminated since the processor already has the needed data. This increases the effective I/O throughput by a strategy which usually, but not always, works. It should be noted that this strategy does not exclude other approaches to increasing throughput, and can be used in conjunction with increases in clock speed and bus width if the data skew problem can be pragmatically overcome.

SUMMARY OF THE INVENTION

The problems outlined above are in large part solved by an input/output (I/O) architecture which determines and implements the correct delay to each individual data line, thereby aligning all the incoming data, and provides a clock signal to indicate the optimal data sampling time. In the described embodiment, a data transmission unit time multiplexes four 32 bit words onto 32 line drivers which operate at 1 Gb/s (one gigabit per second). A 500 MHz clock signal is also transmitted along the bus. At the receiving end, delays for the 32 lines are individually tailored to remove the data skew relative to the clock signal, and the data is demultiplexed using every transition of the bus clock. This circuit enables the transmission of four 32 bit words in parallel in one clock cycle of a 250 MHz processor.

Broadly speaking, the present invention contemplates a computer system which comprises elements which transmit and receive data across a data bus. At least some of the elements include a data bus interface with a data reception unit which can provide individually tailored delays for each incoming data line in order to cancel any differences in propagation time that the incoming data signals experience.

The present invention further contemplates a data bus interface which can be incorporated into elements of a computer system. The data bus interface includes a data reception unit which can provide individually tailored delays for each incoming data line in order to cancel any differences in propagation time that the incoming data signals experience.

The present invention still further contemplates a method for high speed I/O by which delays are applied to received data signals to align them with each other and a sampling time is determined for sampling the received and aligned data signals.

By enabling the use of larger bus sizes at high data transfer rates, this invention may yield much higher data transfer rates than those which can be achieved using conventional techniques.

BRIEF DESCRIPTION OF THE DRAWINGS

Other objects and advantages of the invention will become apparent upon reading the following detailed description and upon reference to the accompanying drawings in which.

Figure 1:
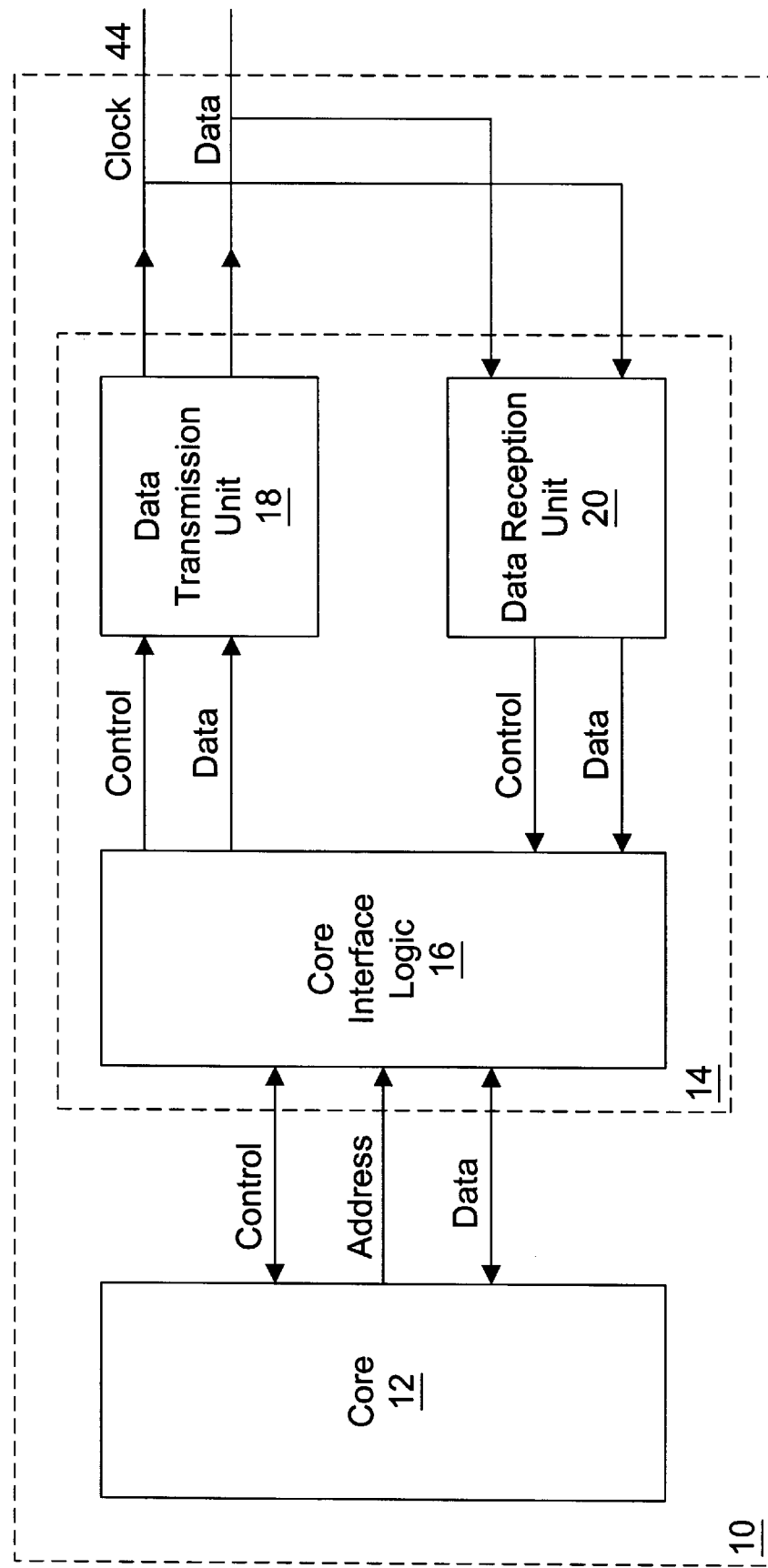
FIG. 1 is a block diagram of an element comprised of a core and a data bus interface.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

FIG. 1 illustrates a block diagram of an element 10 which will be coupled to other elements on the same computer board. The coupling will comprise a data bus and a clock signal line. Examples of coupling configurations will be provided below. Element 10 comprises a core 12 coupled to send and receive data via a bus interface 14. Bus interface 14 comprises a core interface 16 coupled to core 12, a data transmission unit 18 coupled to core interface 16 and the data bus, and a data reception unit 20 also coupled to core interface 16 and the data bus.

Generally speaking, the embodiment described above is intended to provide parallel high speed data transmission between elements. Data transmission unit 18 will serve to multiplex data and deliver it at high speed to the data bus. Data reception unit 20 will serve to remove data skew by tailoring individual delays for each of the incoming data lines, and thereafter demultiplex the data. Further details on data transmission unit 18 and data reception unit 20 are provided below.

Core 12 serves whatever primary function element 10 is intended for. Typically, this might be a general purpose processor or DSP, but it could also be a memory module or a gateway to a slower bus for external I/O.

Core interface 16 provides the logic necessary for routing data to and from the data bus. Typically, it will comprise some registers and address logic with access to the local on-chip bus.

Figure 2:
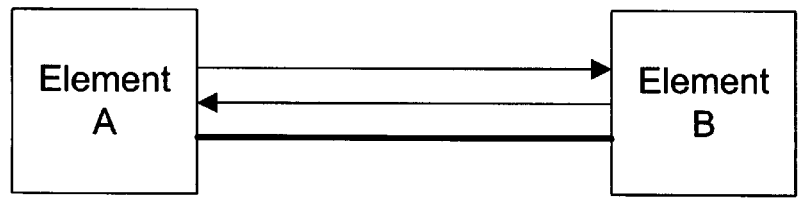
FIG. 2 through FIG. 5 are examples of configurations of elements supported by current invention.

FIG. 2 provides an example of a coupling configuration in which two elements are coupled by a single, bi-directional data bus and two uni-directional clock lines.

Figure 3:
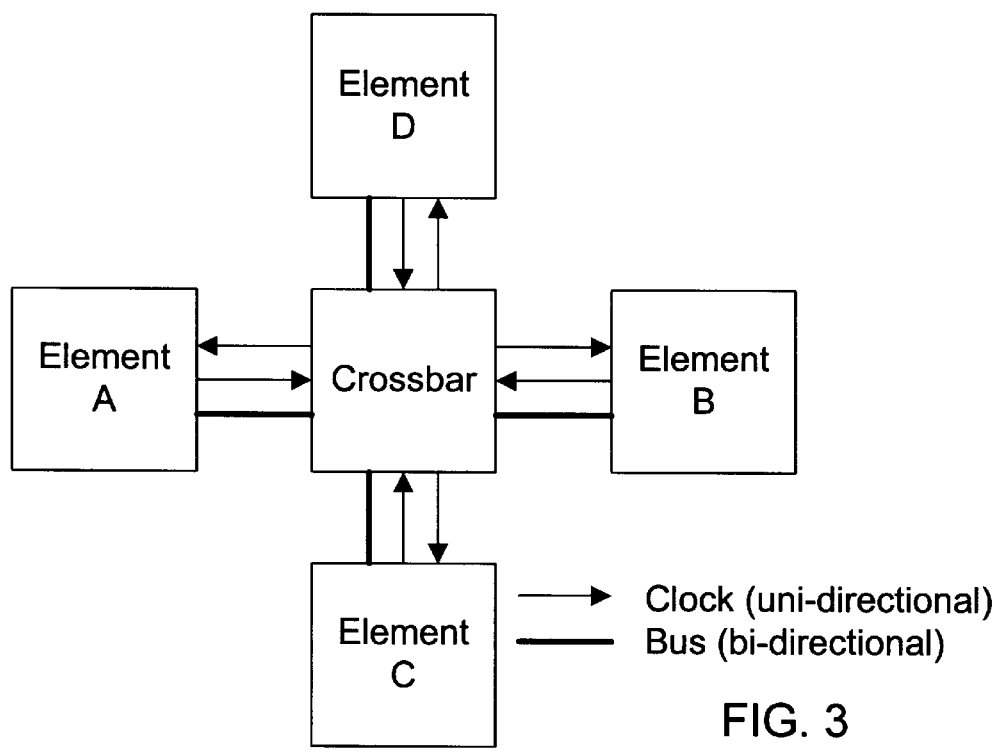

FIG. 3 provides a second example of a coupling configuration in which four elements are each coupled to a central element which serves as a crossbar to enable communications among all four elements.

Figure 4:
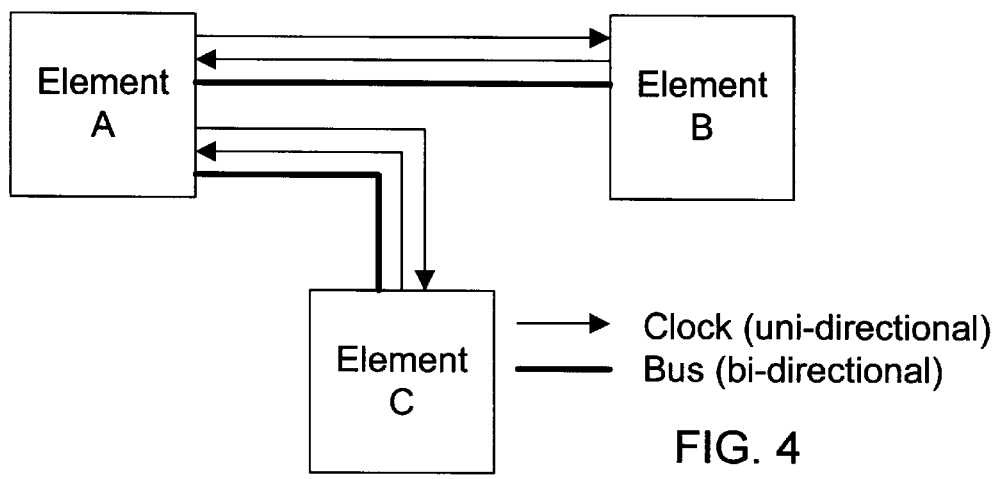

FIG. 4 provides a third example of a coupling configuration in which two elements are coupled to a third element. The third element is configured to provide if needed a path for data flow between the other two elements.

Figure 5:
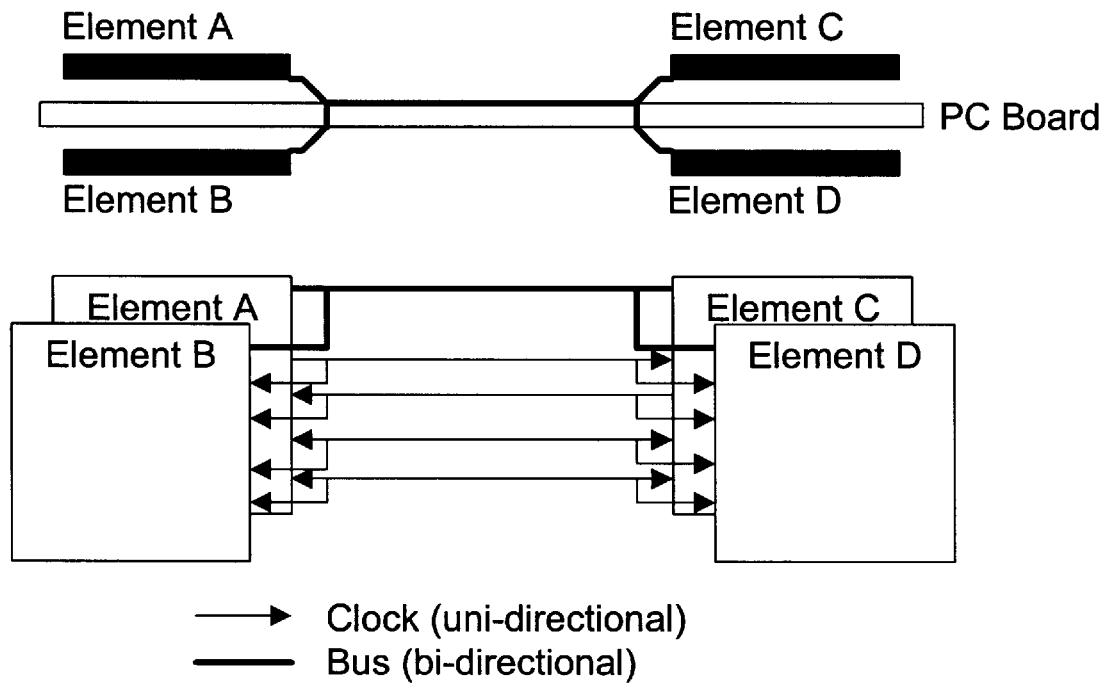

FIG. 5 provides a fourth example of a coupling configuration in which four elements are coupled via a single bus with four drops. Two elements are placed at each end of the bus on opposing sides of a computer board. Four unidirectional clock lines are coupled from each element to the other three. This configuration permits the use of a broadcast bus configuration with a very economical implementation.

Figure 6:
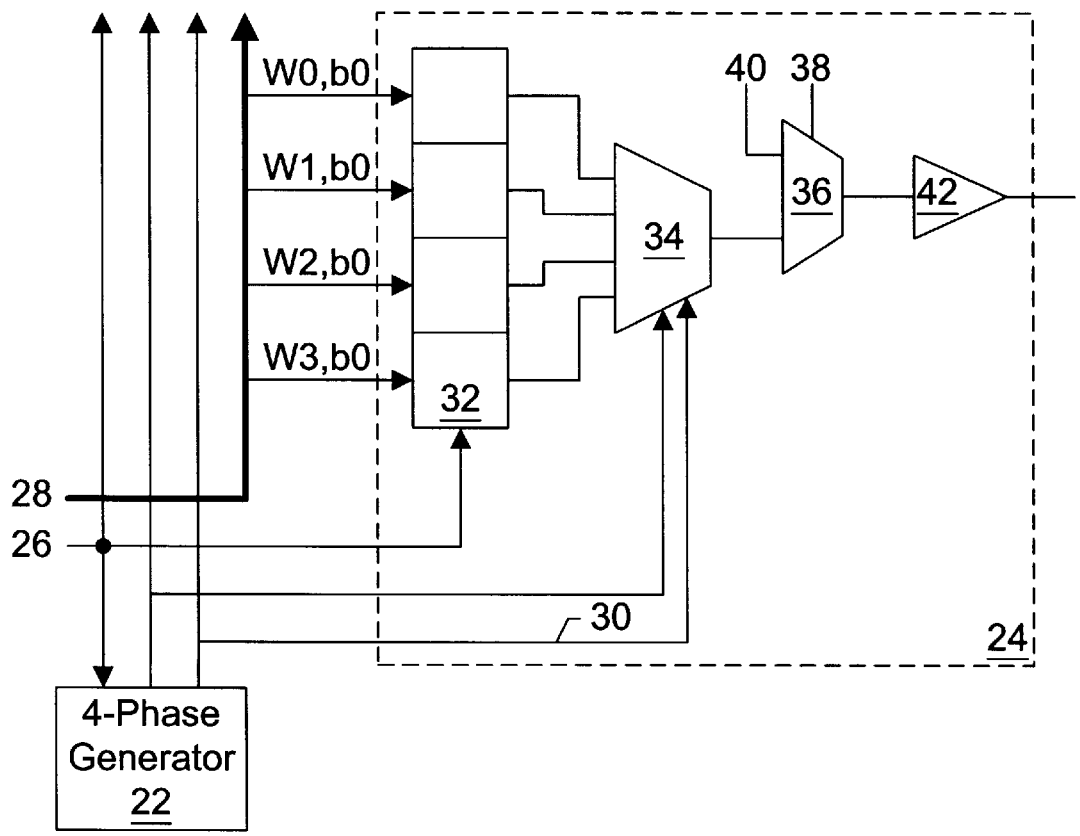
FIG. 6 is a block diagram of a data transmission unit component.

FIG. 6 illustrates a portion of data transmission unit 18 which may include a 4-phase generator 22 and thirty-two repetitions of line driver 24, as will be discussed further below. Line driver 24 comprises a data latch 32 coupled to a core clock signal 26, a bus 28, and to a multiplexer 34. Multiplexer 34 is coupled to 4-phase clock signal 30. A second multiplexer 36 is coupled to multiplexer 34, test signal 40, and testing mode signal 38. A buffer 42 is coupled to second multiplexer 36 and to a data bus line.

The 4-phase generator 22 is a phase-lock loop (PLL) that contains a four delay element VCO. This block is coupled to core clock 26, and configured to generate two differential delayed versions of core clock 26 which are 90 degrees out of phase. The two delayed versions form 4-phase clock signal 30.

Data latch 32 stores contents of bus 32 when triggered by core clock 26. Data latch 32 then contains the four bits corresponding to a given bit position in four 32-bit words provided for transmission.

The contents of data latch 32 is passed to multiplexer 34. Multiplexer 34 switches based on 4-phase clock signal 30, thereby passing each of the four data latch output signals one at a time to multiplexer 36.

Multiplexer 36 switches based on testing mode signal 38, thereby passing either test signal 40 or the output signal from multiplexer 34 on to buffer 42.

Figure 6B:
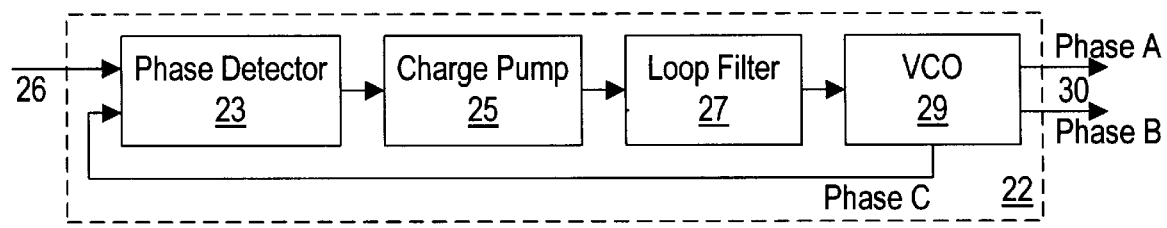
FIG. 6b is a block diagram of a 4-phase clock generator.

FIG. 6b provides a block diagram of 4-phase generator 22. The 4-phase generator includes a phase detector 23 coupled to receive core clock 26 and a feedback clock signal. Phase detector 23 then provides a signal representing the phase error to a charge pump 25 which performs amplification. The amplified phase error signal is filtered by loop filter 27 to determine a voltage input to VCO 29. The voltage input serves to increase and decrease the oscillation frequency of VCO 29 as necessary. Two differential clock signals are provided at the output of VCO 29. These signals are used as 4-phase clock signal 30.

Figure 6C:
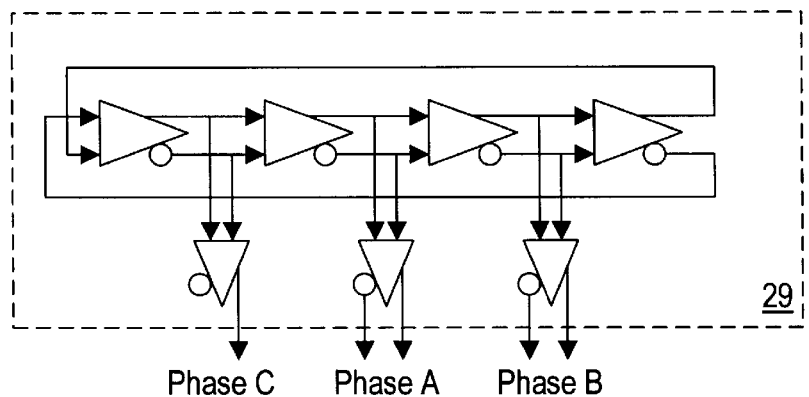
FIG. 6c is a block diagram of a four delay element voltage controlled oscillator (VCO)
Figure 6D:
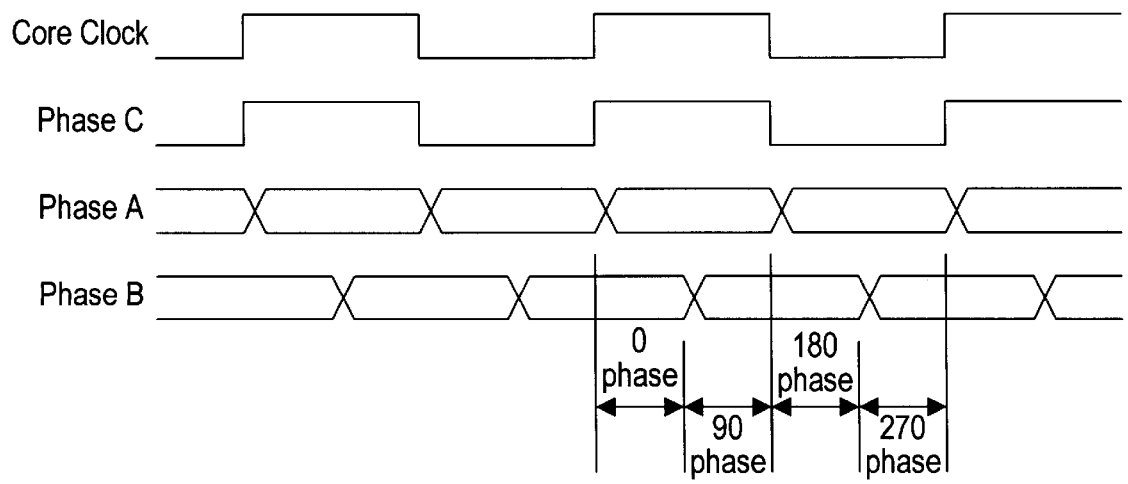
FIG. 6d is a timing diagram illustrating the phase relationship of a core clock signal and the 4-phase clock signals.

FIG. 6c illustrates the function of VCO 29. VCO 29 comprises an array of four inverting amplifiers which are coupled in an oscillator ring. The delays provided by each of the amplifiers are essentially equal, so that the signals at the output of two adjacent inverting amplifiers are 90 degrees out of phase. FIG. 6d shows the resulting phase relationship of the output clock signals to the input clock signal. Also shown is the feedback clock signal.

Figure 7:
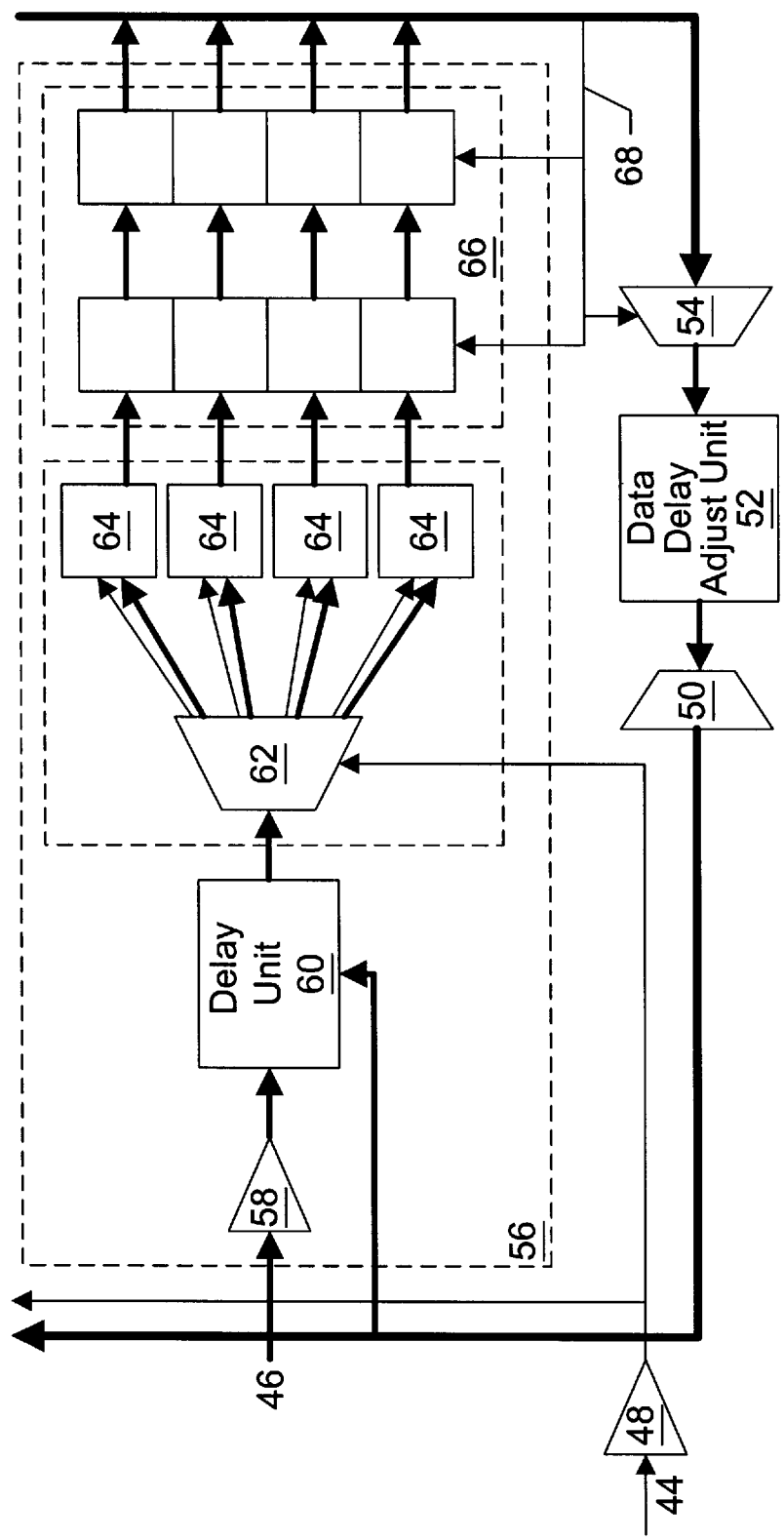
FIG. 7 is a block diagram of a data reception unit component.

FIG. 7 illustrates a portion of data reception unit 20, which comprises a bus clock buffer 48 coupled to the bus clock line, a data delay adjust unit 52, and a delay adjust multiplexer 50 and demultiplexer 50 pair. Details on the operation of the data delay circuit will be provided below. Data reception unit 20 may further include thirty-two repetitions of line receiver 56.

Line receiver 56 comprises a line buffer 58 coupled to a data bus line 46, a delay unit 60 coupled to line buffer 58, a demultiplexer 62 coupled delay unit 60 and bus clock buffer 48, four data latches 64 coupled to demultiplexer 62, and a first-in first-out buffer 66 coupled to data latches 64 and a core clock 68.

Data bus line 46 carries a four-fold multiplexed signal produced by a data transmission unit. Line buffer 58 buffers and amplifies the signal from data bus line 46. Delay unit 60 is configurable to provide for the essential removal of data skew of the signal from data bus line 46, relative to the signal on the bus clock line. Details on the configurability of delay unit 60 are provided below. It should be noted that though line buffer 58 and delay unit 60 are shown as separate units for clarity, in practice they are implemented as a single buffer-delay circuit.

The output signal of delay unit 60 enters demultiplexer 62 which switches on every clock edge in the bus clock, thereby steering the time multiplexed signal from delay unit 60 to the four data latches 64. The time demultiplexed signal provided by the four data latches is clocked into first-in first-out buffer 66 by the core clock 68. The output data of first-in first-out buffer 66 is connected to a four-bit bus which is one of thirty-two four-bit buses that connect to delay adjust multiplexer 54.

Delay adjust multiplexer 54 is coupled to thirty-two four-bit buses. At a given time during the training phase, the multiplexer will pass on the contents of one of the four bit buses to data delay adjust unit 52. In a manner which will be outlined below, data delay adjust unit 52 operates to determine a five bit data delay signal.

Delay adjust demultiplexer 50 couples the five bit data delay signal from data delay adjust unit 52 to one of the thirty-two delay units 60, the delay unit coupled to is the one which corresponds to the line receiver whose output signal is coupled to data delay adjust unit 52.

Figure 8:
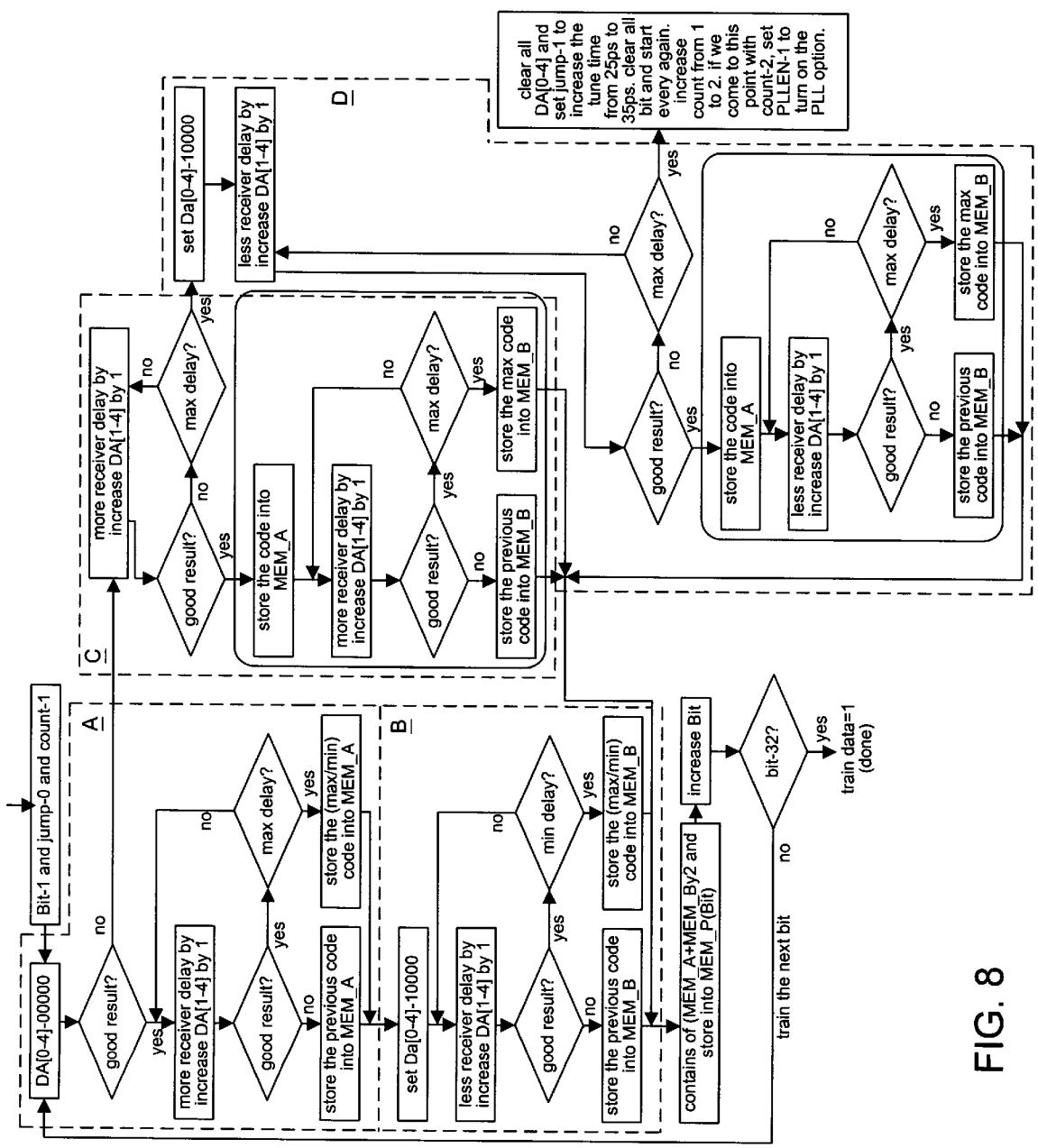
FIG. 8 is a flow diagram illustrating the function of the data delay adjust unit.

An exemplary algorithm implemented by data delay adjust unit is illustrated by the flowchart shown in FIG. 8. During the training phase a known test signal 40 is transmitted. One useful signal would be an alternating 1 0 1 0 1 0 . . . At the output of FIFO 66 at the receiver end, the signal 1 0 1 0 would then be designated as "good" and all other possibilities are "bad".

The algorithm begins with the initialization of variables, then enters block A. If the FIFO output signal is good, the data delay adjust unit begins iteratively increasing the delay value upward until either the maximum delay is reached or the FIFO output signal becomes bad. This point is stored as the upper end of the range, and control passes to block B, where the data delay adjust unit begins iteratively decreasing the delay value until either the minimum delay is reached or the FIFO output signal becomes bad. This point is stored as the lower end of the range. After control exits block B the midpoint of the good range is calculated and the delay value set accordingly. The algorithm then moves to the next line receiver and repeats until all delay values have been set.

Returning to block A, if the FIFO output signal is not initially good, the control passes to block C where the data delay unit iteratively increases the delay value until the FIFO output signal becomes good or the maximum delay is reached.

For the former, the value is stored as the lower end of the range and the data delay adjust unit continues to iteratively increase the delay value until the FIFO signal becomes bad or the maximum delay is reached, at which point the value is stored as the upper end of the range and control is passed from block C to the midpoint calculation and delay value setting.

For the latter, control is passed to block D where the data delay adjust unit iteratively decreases the delay value until the FIFO signal becomes good or the minimum delay value is reached. If the minimum delay value is reached, the algorithm admits failure and tries again from the beginning. If failure occurs a second time, delay values are reset to zero, and the traditional method of aligning the clock to the data signals is attempted.

If the minimum delay is not reached before the FIFO signal becomes good, then the delay value at which the signal becomes good is stored as the upper end of the range. The data delay adjust unit continue iteratively decreasing the delay value until the FIFO signal becomes bad or the minimum delay is reached. The value at this point is stored as the lower end of the range and control passes from block D to the midpoint calculation and delay value setting. Once all delay values have been set, the algorithm concludes successfully.

Figure 9:
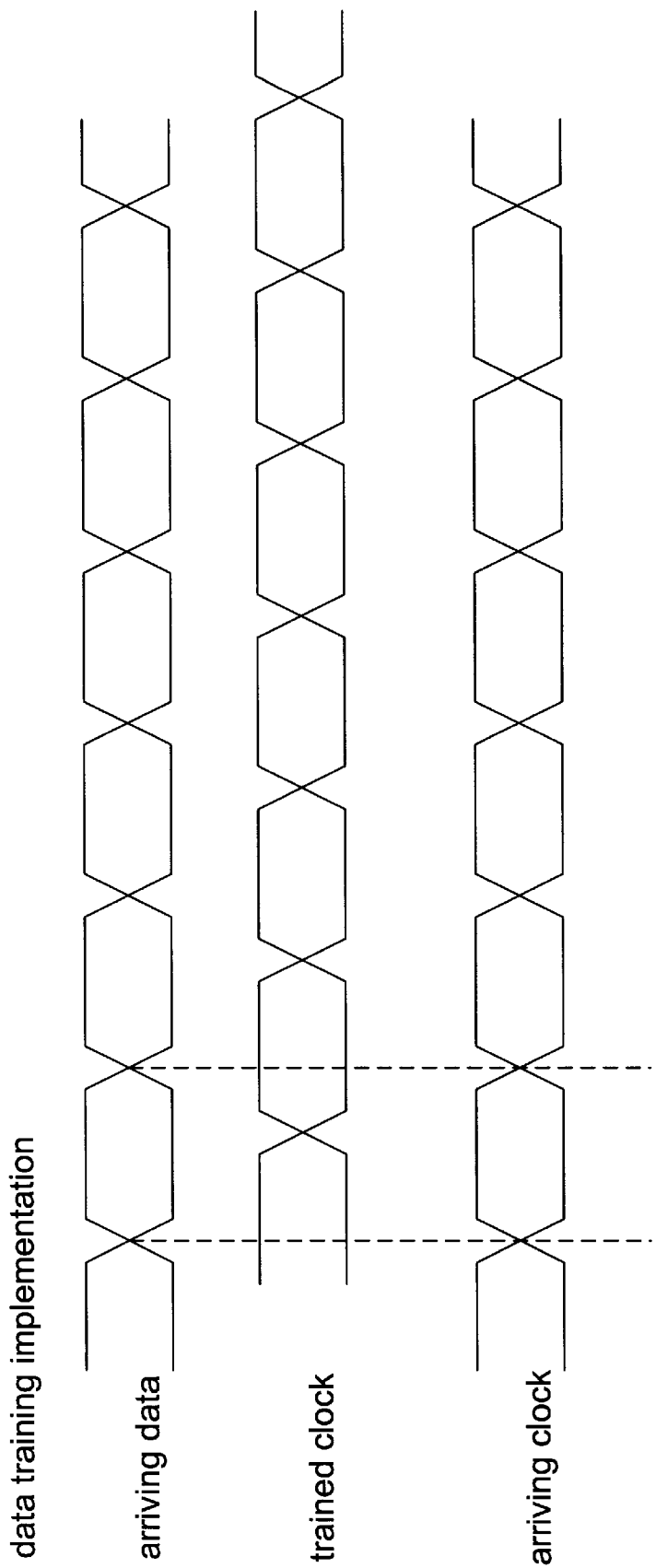
FIG. 9 is a timing diagram which will be used to describe operation of a data reception unit.

In summary, for each bit line, one at a time, the data delay adjust unit traverses the range of possible delays to determine the range in which the output signal of the FIFO is good, and after determining this good range, the data delay adjust unit fixes the delay produced by the delay unit near the center of the good range. This yields a result as illustrated in the timing diagram of FIG. 9. After accomplishing this for each of the bit lines, the data delay adjust unit has succeeded in aligning all of the bit lines with each other relative to the bus clock. This technique of aligning the individual data signals to a clock signal at the receiving end allows significantly relaxed tolerances in the bus layout which permit feasible construction of larger buses at higher clock speeds.

The mechanism used for implementing the delay element is based on the well known switching speed properties of popular differential amplifiers. In essence, by regulating the size of the current source in a differential amplifier, the time it takes for a signal to propagate through the amplifier can be varied.

Figure 10:
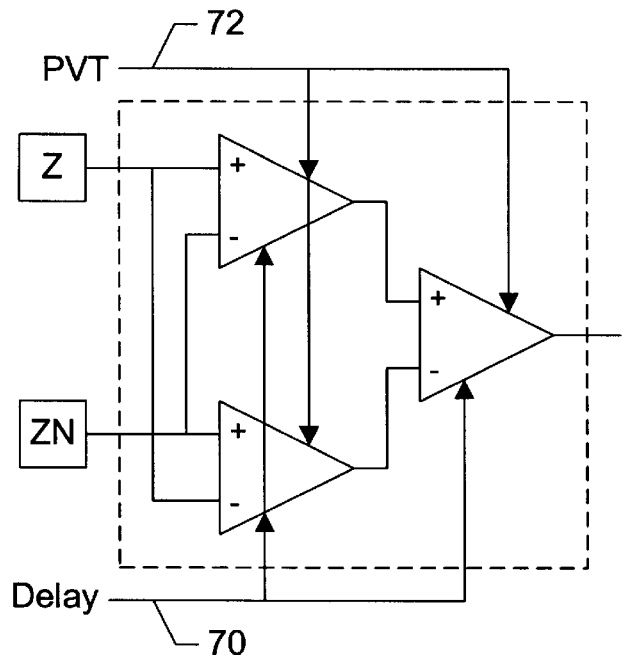
FIG. 10 is a functional diagram of illustrating the operation of a modifiable delay unit.
Figure 11:
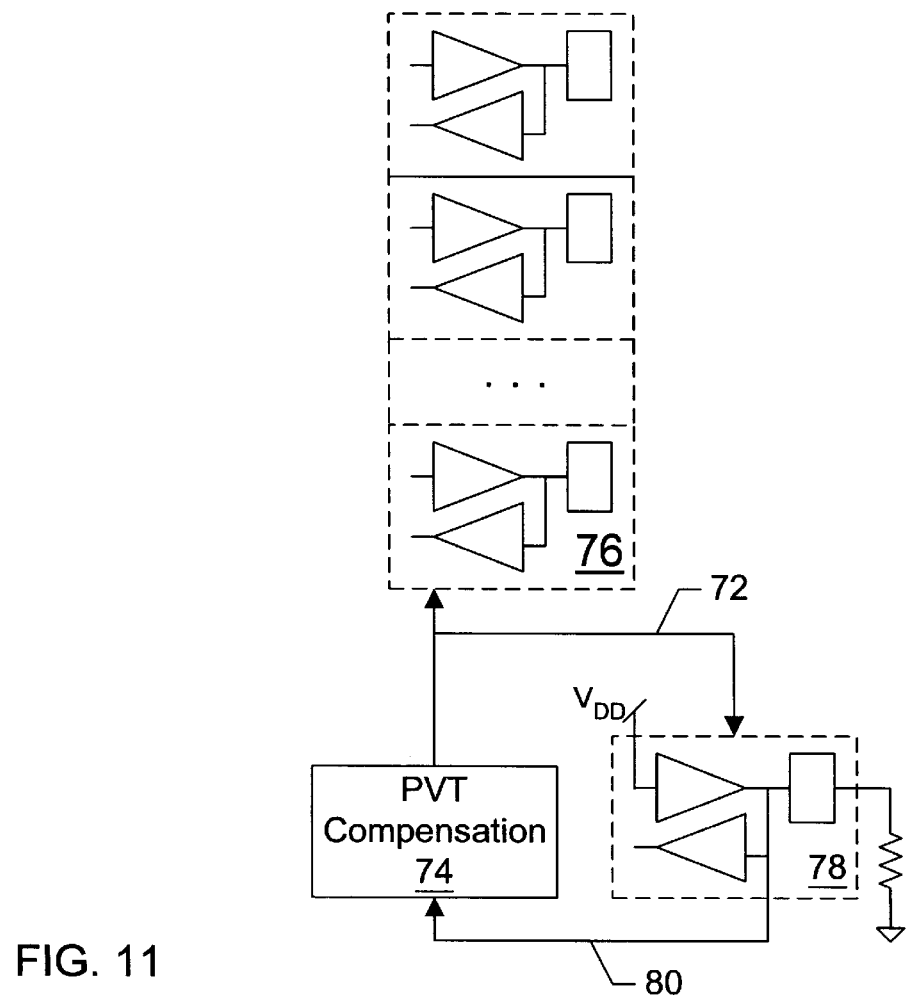
FIG. 11 is a block diagram illustrating a method for impedance matching I/O buffers to a bus line.

The differential amplifier shown in FIG. 10 is configurable by two parameters: the delay parameter 70 set by data delay adjust unit 52, and the PVT parameter 72 set by the process, voltage, and temperature (PVT) compensation unit 74 shown in FIG. 11. The delay parameter is used to set a nominal delay, and the PVT parameter is used to fine-tune the delay to compensate for PVT variations. FIG. 11 also depicts an array 76 of I/O buffers and an I/O buffer 78 which is coupled to a resistor which in turn is coupled to ground. The PVT compensation unit adjusts the PVT parameter 72 of extra buffer 78 until the signal at point 80 is equal to $V_{DD}/2$, thereby providing an output impedance which is equal to the impedance of the resistor. The same PVT parameter 72 is forwarded to array 76 since it is assumed that the process, voltage, and temperature characteristics do not vary significantly from buffer to buffer.

Figure 12:
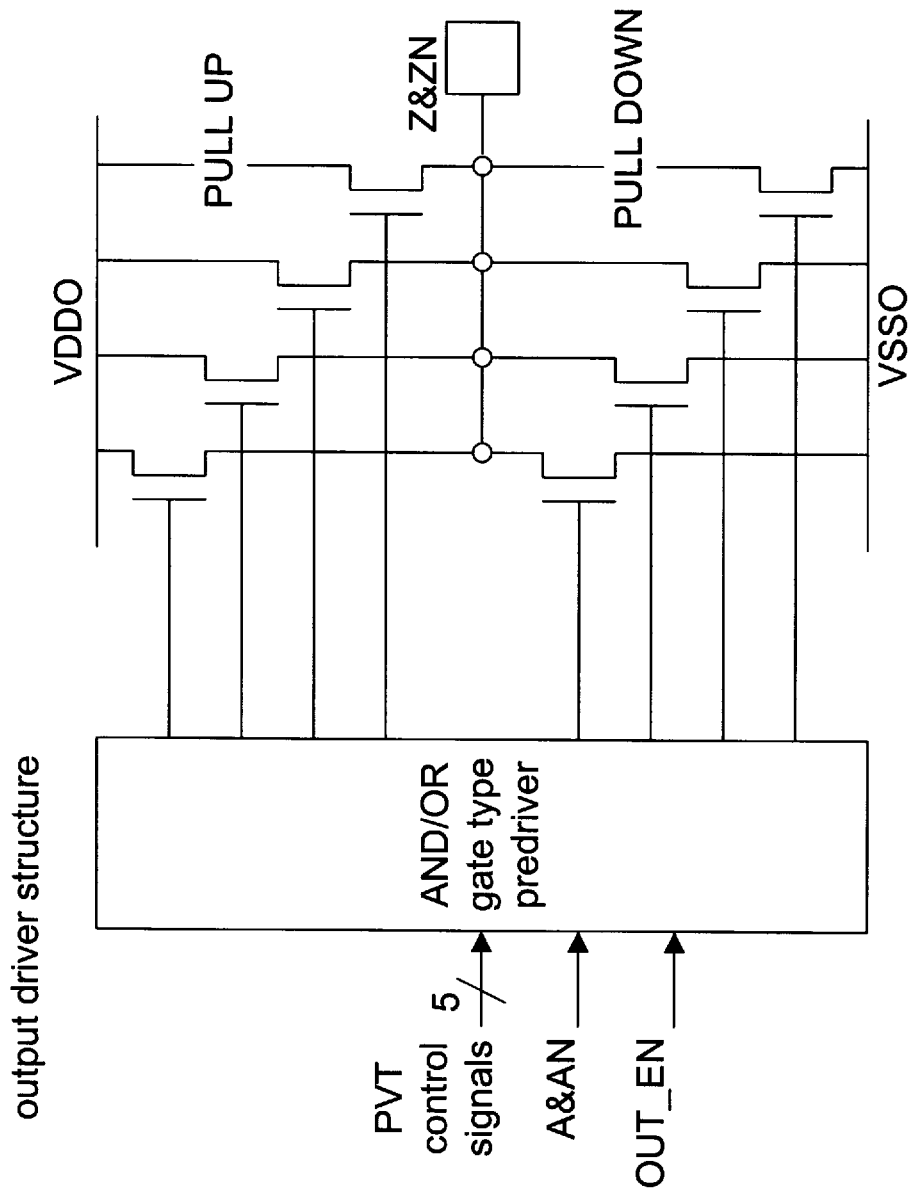
FIG. 12 is diagram illustrating an implementation for controlling the impedance of I/O buffers.

The PVT parameter 72 is also used to control the output impedance as shown in FIG. 12. The output impedance matching is provided by a configurable array of pull-up and pull-down field-effect transistors (FETs). By changing the configuration of the FET array by enabling or disabling some of the FET pairs, the output impedance can be adjusted to match the desired impedance.

It is noted that while in this embodiment, the data bus is described as a bi-directional point-to-point bus, the data bus may take other forms including, for example, a backbone-type bus or a unidirectional broadcast bus.

Numerous variations and modifications will become apparent to those skilled in the art once the above disclosure is fully appreciated. It is intended that the following claims be interpreted to embrace all such variations and modifications.

What is claimed is:

1. A data bus interface for fast parallel I/O comprising:
    a core interface configured to accept output data from a core for transmission and configured to provide to said core input data which has been received;
    a data transmission unit coupled to said core interface to receive said output data for transmission and configured to drive a plurality of output signals representing said output data across a data bus in a fixed-phase relationship with a bus clock signal; and
    a data reception unit coupled to said data bus to receive a plurality of input signals representing said input data and configured to synchronize said plurality of input signals to each other in a fixed-phase relationship with said bus clock signal, thereby reducing clock skew of said plurality of input signals, said data reception unit comprising:
        a plurality of delay elements each coupled to receive a corresponding one of said plurality of input signals;
        a first-in first-out buffer for synchronizing said input data to a core clock signal;
        a data delay adjust unit coupled to an output of said first-in first-out buffer and configured to set the individual delays of said plurality of delay elements;

a demultiplexer coupled to receive a delayed input data signal from each of said plurality of delay elements, coupled to receive a bus clock signal, and configured to time-demultiplex the delayed input data signal from each of said plurality of delay elements in response to changes in said bus clock signal; and a plurality of data latches coupled to receive time-demultiplexed output data from said demultiplexer, and thereafter synchronously provide said time-demultiplexed output data as an input signal to said first-in first-out buffer.

2. The data bus interface for fast parallel I/O as recited in claim 1, wherein each of said plurality of delay elements comprises a differential amplifier with a variable current source which is configured to permit adjustment of signal propagation time through the differential amplifier.

3. The data bus interface for fast parallel I/O as recited in claim 1, wherein said data transmission unit comprises:

a four-phase clock generator coupled to receive a second core clock signal and configured to provide delayed versions of said second core clock signal to form a four-phase clock signal; and an array of line drivers, each of which comprises:
a four-bit buffer configured to store data for transmission; and
a first multiplexer coupled to receive said four-phase clock signal, coupled to receive data from said four-bit buffer, and configured to multiplex data from said four-bit buffer in response to changes in said four-phase clock signal.

4. The data bus interface for fast parallel I/O as recited in claim 3, wherein each of said array of line drivers further comprises:

a second multiplexer coupled to receive an output signal from said first multiplexer, coupled to receive a test signal, and configured to pass one of said output or test signals in response to a testing mode signal; and a buffer coupled to drive the output signal from said second multiplexer onto a bus data line.

5. The data bus interface for fast parallel I/O as recited in claim 3, wherein said plurality of data latches includes a set of four data latches.

6. The data bus interface for fast parallel I/O as recited in claim 5, wherein said time-demultiplexed output data includes four bits of time-demultiplexed output data.

7. A computer system which comprises:

a data bus which is coupled between elements configured to transmit and receive data across said data bus, each of said elements comprising:
a core; and
a data bus interface coupled to said core, said data bus interface including:
a core interface configured to accept output data from said core for transmission and configured to provide to said core input data which has been received;
a data transmission unit coupled to said core interface to receive said output data for transmission and configured to drive a plurality of output signals representing said output data across said data bus in a fixed-phase relationship with a bus clock signal; and a data reception unit coupled to said data bus to receive a plurality of input signals representing said input data and configured to synchronize said plurality of input signals to each other in a fixed-phase relationship with said bus clock signal, thereby reducing clock skew of said plurality of input signals, said data reception unit including:

a plurality of delay elements each coupled to receive a corresponding one of said plurality of input signals;

a first-in first-out buffer for synchronizing said input data to a core clock signal;

a data delay adjust unit coupled to an output of said first-in first-out buffer and configured to set the individual delays of said plurality of delay elements;

a demultiplexer coupled to receive a delayed input data signal from each of said plurality of delay elements, coupled to receive a bus clock signal, and configured to time-demultiplex the delayed input data signal from each of said plurality delay elements in response to changes in said bus clock signal; and a plurality of data latches coupled to receive time-demultiplexed output data from said demultiplexer, and thereafter synchronously provide said time-demultiplexed output data as an input signal to said first-in first-out buffer.

8. The computer system as recited in claim 7, wherein each of said plurality of delay elements comprises a differential amplifier with a variable current source which is configured to permit adjustment of signal propagation time through the differential amplifier.

9. The computer system as recited in claim 7, wherein said data transmission unit comprises:

a four-phase clock generator coupled to receive a second core clock signal and configured to provide delayed versions of said second core clock signal to form a four-phase clock signal; and an array of line drivers, each of which comprises:
a four-bit buffer configured to store data for transmission; and
a first multiplexer coupled to receive said four-phase clock signal, coupled to receive data from said four-bit buffer, and configured to multiplex data from said four-bit buffer in response to changes in said four-phase clock signal.

10. The computer system as recited in claim 9, wherein each of said array of line drivers further comprises:

a second multiplexer coupled to receive an output signal from said first multiplexer, coupled to receive a test signal, and configured to pass one of said output or test signals in response to a testing mode signal; and a buffer coupled to drive the output signal from said second multiplexer onto a bus data line.

11. The computer system as recited in claim 9, wherein said plurality of data latches includes a set of four data latches.

12. The computer system as recited in claim 11, wherein said time-demultiplexed output data includes four bits of time-demultiplexed output data.

* * * * *